United States Patent [19]
Halliger et al.

[11] 3,918,779
[45] Nov. 11, 1975

[54] SYSTEM FOR SECURING ROLLER BEARINGS

[75] Inventors: Leonhard Halliger; Horst Schroder, both of Schweinfurt, Germany

[73] Assignee: SKF Industrial Trading and Development Company B.V., Amsterdam, Netherlands

[22] Filed: May 14, 1973

[21] Appl. No.: 360,399

[30] Foreign Application Priority Data
May 19, 1972 Germany.......................... 2224437

[52] U.S. Cl. ............... 308/236; 403/368; 403/374; 403/409; 403/371
[51] Int. Cl.² ......................................... F16B 2/14
[58] Field of Search ............ 308/236; 403/367, 368, 403/371, 374, 409

[56] References Cited
UNITED STATES PATENTS

| 438,768 | 10/1890 | Reiue................................ 403/313 |
| 929,851 | 8/1909 | Hess................................. 403/371 |
| 2,100,725 | 11/1937 | Styri................................ 308/236 |
| 2,118,891 | 5/1938 | Marino.............................. 403/371 |
| 2,168,469 | 8/1939 | Brouwer........................... 308/236 |
| 3,481,655 | 12/1969 | Campbell.......................... 308/236 |
| 3,806,215 | 4/1974 | Price et al........................ 403/374 |

FOREIGN PATENTS OR APPLICATIONS
866,836   5/1961   United Kingdom................ 308/236

*Primary Examiner*—Werner H. Schroeder
*Assistant Examiner*—Conrad L. Berman

[57] ABSTRACT

A system for securing cylindrical members such as a roller bearing on a shaft or in the bore of a sleeve bushing wherein the cylindrical members are formed so that a portion of one abuts the other. The corresponding surface of one of the cylindrical members is provided with an annular wedge shaped slot narrowing outwardly toward the face end of the member. A retaining member formed as an arcuate piece having at least one axially extending wedge secured thereto is positioned in said slot, to forcibly act on the members and hold them secure with respect to each other.

10 Claims, 12 Drawing Figures

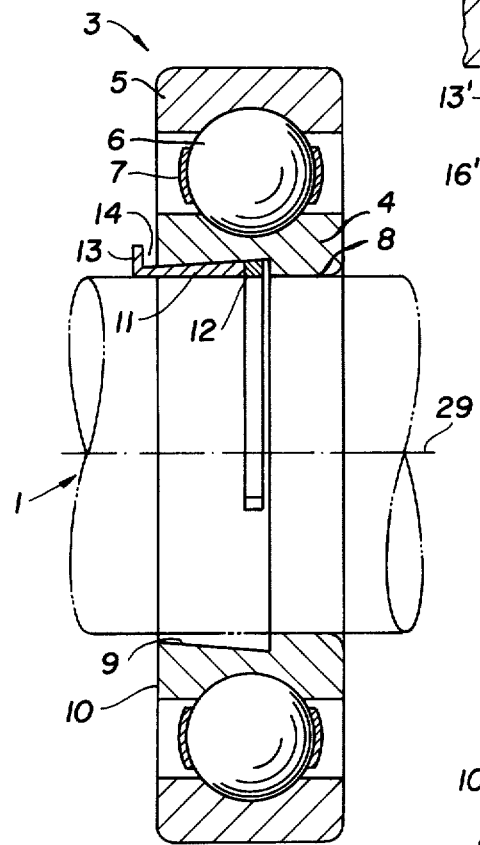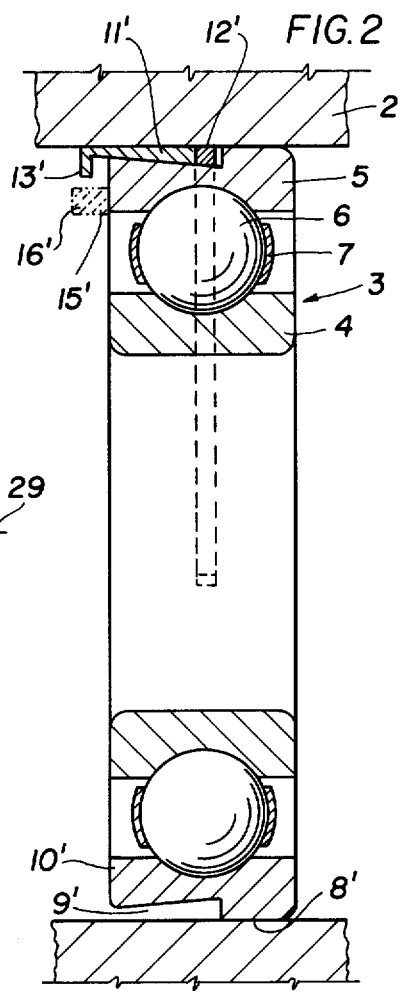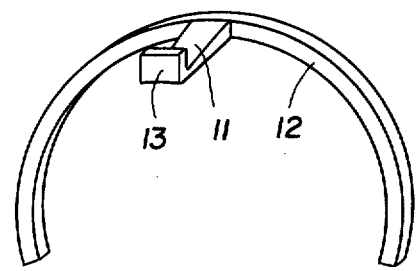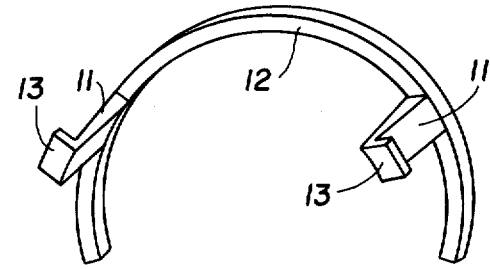

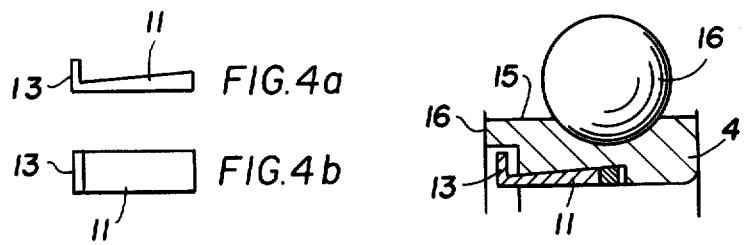
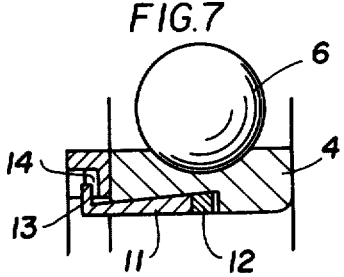
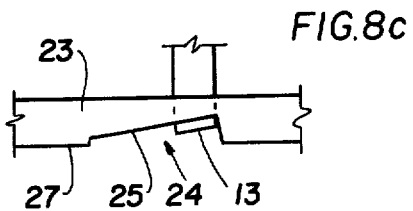

SYSTEM FOR SECURING ROLLER BEARINGS

BACKGROUND OF THE INVENTION

The present invention relates to apparatus for attaching cylindrical members particularly roller bearings about a shaft or within a sleeve bushing where at least a portion of the bore and/or the outer surface of the cylindrical member abuts against the surface of the shaft and/or the bore of the sleeve bushing.

It is known to provide the bore of the inner race ring of a roller bearing with an eccentric recess or cut out which serves to receive an eccentrically shaped ring. By rotating the eccentrically shaped ring relative to the shaft and the inner race ring the shaft and the inner race ring are bound together to be fixed and unshiftable in the axial direction. It is further known to form the inner race ring with a conical through bore, which is adapted to receive a correspondingly conical sleeve. By stressing the conical sleeve by means of a retaining nut, the sleeve wedges between the inner race ring and the shaft and secures the bearing on the shaft against movement in the axial direction. Similar types of arrangements have been employed to secure the bearing about its outer race ring within a sleeve-like bushing. These devices are generally complex, difficult to install, and have separable parts which may be easily lost before installation.

It is an object of the present invention to provide apparatus for securing cylindrical members, such as roller bearings on a shaft or within a sleeve bushing which overcome the disadvantages of prior art.

It is another object of the present invention to provide apparatus for securing a roller bearing by its inner or outer race rings which is simpler, less complicated and easier to install than the prior art devices.

It is another object of the present invention to provide apparatus for securing roller bearings to a shaft or a sleeve bushing in which the means to do so are less likely to be lost and are formed in a unitary construction so as to reduce the number of individual parts.

These objects, other objects and numerous advantages, will be seen from the following disclosure of the preferred forms of the present invention.

SUMMARY OF INVENTION

According to the present invention these objects and advantages are obtained by providing a wedged shape annular slot in the surface of the bore and/or in the surface of the cylindrical member inserted in the bore, which wedge shape slot narrows outwardly toward the face end of the cylindrical member. An arcuate member having an axially extending wedge secured to it is inserted within the slot so as to secure the two cylindrical members against axial movement. Preferably the arcuate member is at least semicircular in extent and is formed preferably from an elastic or spring-like material such as steel, plastic or the like. The arcuate member and its extending wedge can be formed integrally of one piece or of two pieces which are glued, welded or otherwise secured together. By this construction it will be seen that in order to insert the arcuate member and its axially extending wedge in the annular slot of the cylindrical member in which it is formed, the arcuate member and the extending wedge must be slightly compressed. After it is inserted it then resiliently expands outwardly so that the wedge, the arcuate member, and the cylindrical member about which it is secured form aa unitary construction which is thereafter inseparable and the parts of which cannot be subsequently lost.

An advantageous embodiment of the invention is provided when at least two axial wedges are provided spaced uniformly about the annular slot and by means of a single arcuate member joined together. The employment of two wedges provides in combination with the bore of the inner cylindrical member and the surface of the outer cylindrical member a three point securement. This triangular array may be preferred in many situations since it may provide a more uniform distribution of forces about the cylindrical axis. The axial wedges can be joined together by more than one arcuate member which are arranged axially one behind the other so that in each instance and under all bearing load conditions they remain axially parallel aligned. In other embodiments two wedges may be employed set apart 180° from each other.

It is further advantageous according to the present invention to provide the ends of the wedges with radially outwardly directed tabs. To bind, for example, the inner ring and the shaft or the outer ring of the bearing with the sleeve bushing under proper tension, an assembly tool is driven into the space between the radially extending tabs and the end face of the cylindrical bearing member itself, or the blade of a screwdriver is inserted and so turned, that the space between the tabs and the end face of the cylindrical member is greatly enlarged. In this manner the axial web is pulled axially within the slot between the cylindrical members increasing the wedging force on the opposing surfaces. In another embodiment great advantage is obtained when the cylindrical member is made with an annular shoulder over which the wedges extend in the axial direction. This annular shoulder provides a smooth end face against which other machine elements can abut. In this manner, the wedges are protected under the shoulders so that the other machine elements will not interfere with them. In another embodiment the wedges extend axially from the end face of the cylindrical member and are provided on their outer surfaces with a screw threading. A nut or similar element is screwed over the extending edges of the wedges to press against the end face of the cylindrical member. This not only secures the wedges in place but also acts to axially pull the wedges into tighter relationship with the corresponding surfaces.

The securement of the cylindrical bearing member on a shaft can be obtained in a very advantageous way when the wedges have radially extending tabs, by merely providing a bayonet type securing ring to fit over the tabs. This bayonet ring is provided with recesses having pitched or inclined faces. Here, in addition to the pitched faces, which serve to axially stress the wedges, a face perpendicular to the axis can be provided which places the tabs in a securely held position. The bayonet ring forms together with the wedges and the arcuate member as well as with the cylindrical member an easily disassembled unitary construction. In order to assemble this construction on a shaft or in a bushing, it is only necessary to turn the bayonet ring angularly about the axis of the shaft. As a result the wedges are simultaneously pulled in the axial direction so that they are stressed between the cylindrical members. Since the recesses necessary in the bayonet ring to accomplish this locking feature only require a very small angular displacement, the remaining portions of the bayonet ring can be formed having flat or smooth abutment faces against which other machine elements can be placed. It is also possible to provide the bayonet ring in its circumferential edge with an annular shoulder so that the tongues or edges of the tabs extending from the wedges are fully protected within the bayonet ring.

Full details and use of the present invention are given in the following description and are shown in the accompanying drawings.

BRIEF DESCRIPTION OF DRAWINGS

In the drawings:

FIG. 1 is a sectional view through a roller bearing secured by its inner ring to a shaft in accordance with the present invention, FIG. 2 is a view similar to that of FIG. 1 showing the roller bearing secured by its outer ring to a sleeve bushing, FIGS. 3a and 3b are axio metric views of the wedges and arcuate ring assemblies employed in the present invention, FIGS. 4a and 4b are side and plan views respectively of a wedge member, FIG. 5 is a partial section view showing the outer ring of a roller bearing having a shoulder extending over a wedge shaped member formed with an extending tab, FIG. 6 is an axial section similar to FIGS. 1 and 2 showing a wedge member having an axial extension secured by a threaded nut, FIG. 7 is a sectional view showing the use of a bayonet ring to tension the wedge, FIGS. 8a and 8b are axio metric views of a bayonet ring, and FIG. 8c is a plan view of the bayonet ring.

DESCRIPTION OF INVENTION

Turning now to FIG. 1 the present invention is illustrated with regard to the mounting of a shaft 1 within the inner ring of a ball bearing 3. It will be understood that instead of a ball bearing other mountings of a well and hub with other cylindrical members can and is possible. The ball bearing 3 comprises an inner race ring 4, an outer race ring 5, a plurality of balls 6 and a cage 7. The bore of the inner race ring has a cylindrical portion 8 which engages the surface of the shaft 1 and an annular slot cut in its surface. The annular slot is wedged shape and narrows as it extends outwardly toward the end or frontal face 10 of the ball bearing. The cylindrical portion 8 is located on the shaft 1 and is provided with a dimension in accordance with any of the known standards (such as the ISA or International Standards Association or the DIN or the Deutsche Institute Normen) so as to obtain a force fit with the shaft. Located in the ring slot 9 are one or more wedges 11 which are secured to an elastic or slightly compressible arcuate member 12.

FIG. 2 shows an arrangement wherein the outer race ring 5 of a bearing is secured in the bore of a sleeve bushing 2. The outer ring 5 is formed with a cylindrical portion 8' and an annular wedge shaped slot 9' which narrows outwardly of the frontal end 10' of the bearing with respect to the surface of the bushing 2. The cylindrical portion 8' of the outer bearing ring 5 lies against and engages the corresponding section of the bore of the bushing 2. In the annular slot 9' there are found at least one axially extending wedge member 11' to the inner end of which a resilient arcuate member 12' is secured.

The wedge shaped slots 9 and 9' in each of the embodiments extends axially of the member in which it is formed so that its rear wall is slightly over the transverse center line of the bearing elements 6. As a result the wedge members 11 and 11' extend substantially to the mid section of the bearing elements 6 along this transverse line corresponding to the plane in which the bearing elements rotate. As a result the tipping or tilting motion so common with the known eccentrically shaped ring fasteners is obviated. Consequently undesirable abrasion and rubbing between the parts is eliminated thus to avoid fretting corrosion between the members.

The forms of the resilient arcuate member 12 and the wedges 11, as used in the embodiments of FIGS. 1 and 2 are shown in detail in FIGS. 3a and 3b. This assembly is formed from an elastic or at least a slightly spring-like material such as plastic, steel or the like. The arcuate member 12 and the wedges 11 may be either secured together by glue means, welding, or even molded or cast together. The arcuate member 12 is at least semi-circular in form to sufficiently fill the slot 9 so as not to be capable of easily falling out of it. In the embodiment of FIG. 1 wherein the bearing surrounds the shaft it is noted that the arcuate member 12 itself surrounds the shaft and has its outer surface in contact with the surface of the wedge shaped slot 9; while in the embodiment of FIG. 2 the arcuate member 12' surrounds the surface of the slot 9' and has its outer surface in contact with the bushing 2. In each case the slot 9 forms together with either the surface of the shaft 1 or the surface of the bushing 2 an annular space open at one end, namely the frontal end 10 or 10' respectively. This space has a cylindrical surface corresponding to the surface of the shaft 1 or of the sleeve 2 and an opposing inclined or narrowing surface with respect to it formed by the wedge shaped slot. In order to install the bearing around the shaft or within the bushing 2 with the securing means of the present invention the arcuate member 12 is slightly compressed and forced into the space formed by the slot 9 and the corresponding cylindrical surface of the shaft or bushing. Thereafter the resiliency of the arcuate member 12 causes it to spring back so as to forceably engage both the cylindrical surface of the shaft 1 or of the sleeve 2 and the inclined surface of the wedge slot 9 or 9'. Since the wedges 11 or 11' are secured to the arcuate member 12 the assembly builds together a secure radially outward compressive force between the inner ring or outer ring and the shaft 1 or sleeve bushing 12 respectively. Because of the slight resiliency of the arcuate member 12 the assembly of the arcuate member and the radially extending wedges can be inserted within the slot 9 of the inner ring 4 or within the slot 9' of the outer ring 5 before the bearing is itself installed about the shaft 1 or within the bushing 2. The assembly of the arcuate member 12 and the axial wedges 11 will be held in the ring slot 9 forming a unitary assembly with the bearing so that the bearing and the securing assembly of arcuate members 12 and wedges 11 can be packaged, stored and transported together prior to installation. Because of the elastic or resilient nature of the arcuate member 12 the assembly is not easily displaced from its position about the race rings nor will it be easily lost.

In the embodiment of FIG. 1 the free axial end of the wedge shaped members 11 are formed with a radially outwardly bent tab 13. In the embodiment shown in FIG. 2 the wedges 11' are formed with a radially inwardly directed tab 13'. While FIGS. 3a and 3b show the tabs as extending radially outward it will be obvious to those reading this disclosure that they can be easily turned inward in the form shown in FIG. 2.

In order to tightly secure the bearing on the shaft 1 or in the sleeve 2, an assembling tool or key member or the blade of a screwdriver is placed in the space 14 (FIG. 1) formed between the tabs 13 and the frontal end 10 or 10' of the bearing so that the wedge members 11 can be pulled in the axial direction outwardly of the frontal end 10 or 10'. This increases the wedging action between the wedges 11 and 11' and the corresponding surfaces of the annular wedge shaped slots 9 and 9' so that a very strong closing force or compressive force is obtained between the cylindrical surfaces of the shaft 1 or of the sleeve bushing 2 and the bearing itself. As seen more clearly in FIG. 4a and 4b the wedge 11 has a flat or cylindrical lower surface which is to engage the cylindrical member and an inclined surface on top adapted to engage the wedge surface of the annular ring. In the use of the term elastic or flexible in the present context, it is intended that the arcuate member and the wedge shaped member have a degree of rigidity and hardness so as not to be deformed or distorted in shape but to have a degree of overall flexibility and springiness so that it may be flexed and compressed for the purposes intended. Therefore the wedge shaped member can be made from steel having a hard outer surface or from a plastic or similar material.

In FIG. 5 the inner ring of the bearing of FIG. 1 is shown having an axially extending shoulder 15 which radially surrounds the tabs 13 of the axially extending wedges 11. The shoulder 15 has a smooth frontal face 16 which can if desired serve as an abutment surface or bearing surface for additional machine elements (not shown). The shoulder 15 can be used as a safety measure even in the event projecting portions on the securing device is not required. In FIG. 2 the shoulder 15' is shown in phantom. The shoulder 15' also has a flat frontal face 16'. In FIG. 6 which is a section similar to that of FIG. 1, the wedge members 11 have an axially extending tongue 17, the outer surface of which is provided with a screw thread 18. The tongue 17 is adapted to receive a ring 20 having a thread 19 corresponding to that of threads 18. When a plurality of wedge shaped members 11 are provided the threads 18 are formed on each of the extending tongues 17 so that they form together a continuous screw thread profile similar to that on a bolt so that the ring 20 can be turned over the tongues 17 in the fashion of a nut. To enable the ring 20 to be easily screwed onto the tongues 17 axially directed holes 21 are provided in the end face 22 of the ring. The frontal face 22 of the ring 20 is flat and holes 21 are recessed so that the frontal face can also act as an abutment surface or bearing surface for the not shown additional machine elements.

In FIG. 7 a modification of the embodiment of FIG. 1 is shown wherein in the space 14 between the radially extending tabs 13 and the frontal face 10 of the bearing a bayonet ring 23 is inserted. The bayonet ring is shown in greater detail in FIGS. 8a and 8b. The bayonet ring comprises at least one opening 24 which extends in a direction parallel to the axis of rotation 29 of the bearing shown in FIG. 1. The opening 24 has a step-like face 25 which terminates in a flat face 26 extending perpendicular or in a transverse plane to the axis 29. The bayonet ring 23 is provided with a frontal face 27 which is adapted to face away from the frontal face 10 of the bearing as seen in FIG. 7. In order to assemble the securing member comprising the arcuate member 12 and the wedges 11, the bayonet ring is placed over the tabs 13 so that the tabs 13 enter into the opening 24. Rotation of the bayonet ring therefore causes the tabs 13 to ride on the inclined surface 25 being pulled thereby away from the frontal end 10. This pulling continues until the tab 13 reaches the flat portion 26 wherein it may be stationarily held. In the embodiment of FIG. 8c the flat surface 26 is omitted but a substantially longer inclined surface 25 is provided. The bayonet ring 23, the wedges 11 and the arcuate portion 12 to which they are secured together with the inner ring 4 form an inseparable unitary assembly. This assembly can of course be formed prior to installation. The flexing of the arcuate member 12 will hold the entire assembly together with the inner ring 4 so that it may be transported, stored and handled without the parts coming apart or being lost. If desired the outer surface of the bayonet ring may be made as a continuous annular member providing a shoulder 28 for the protection of the tabs 13. The frontal face 27 of the bayonet ring can also be made smooth and planar to form an abutment surface for the not shown additional machine elements. It may also be provided with the holes as in FIG. 6 for the use of a wrench or other assembly tool.

It will be thus seen from the foregoing that in accordance with the present invention a securing system is provided wherein one of the race rings is provided on its surface with an annular wedge shaped slot having a bottom which narrows outwardly toward the end of the bearing and with respect to the cylindrical member with which it is to be mounted. In this slot a securing assembly comprising an arcuate ring to which one or more axially extending members having a wedge shape in cross section is fixed. The wedges cooperate with the wedge shaped ring slot and are flexible and slightly compressible so as to securely hold the ring to the cylindrical member on which it is mounted.

Various modifications, changes and embodiments have been shown and others will be obvious to those skilled in this art. It is intended therefore that the present disclosure be taken as illustrative only and not as limiting of the present invention.

What is claimed :

1. A bearing adapted to be secured on a cylindrical member such as a shaft or in the bore of a sleeve bushing, comprising an inner race member, an outer race member and a plurality of roller means located therebetween, one of the surfaces of one of said race members having a cylindrical portion adapted to abuttingly engage the respective cylindrical member and an annular axially tapered slot formed therein radially narrowing outwardly from said abutting portion toward the outer axial end, and retaining means comprising an arcuate section member having a width less than the axial length of said slot, an internal diameter conforming to that abutting portion and at least one axially extending wedge shaped tongue secured thereto, said axially extending wedge tongue conforming in its cross-section to the taper of said slot and being compressively positioned in said slot, and having a width substantially less than that of said arcuate section member.

2. The bearing according to claim 1 wherein said cylindrical member is the race ring of a roller bearing and said annular slot is formed on the outer surface thereof and extends axially from the plane of rotation of the bearing to the frontal end.

3. The bearing according to claim 1 including a plurality of extending wedges secured to said arcuate section member uniformly arranged about its circumference.

4. The bearing according to claim 1 wherein said wedge is provided with at least one axially extending tongue having a threaded outer surface and a threaded ring adapted to be located over said threaded surface.

5. The bearing according to claim 1 wherein said arcuate member and said extending wedges are formed of a hard resilient material.

6. The bearing according to claim 1 wherein said arcuate member is at least semi-circular in extent and is resiliently force fit into engagement with said annular slot.

7. The bearing according to claim 1 wherein said wedges are provided with radially extending tabs.

8. The bearing according to claim 7 wherein said cylindrical member is provided with an axially extending shoulder extending over the radial tabs.

9. The bearing according to claim 7 including a bayonet ring adapted to be located over said tabs, said ring having an opening and an inclined surface whereby said tabs may be moved in the axial direction by rotation of said ring.

10. The bearing according to claim 9 wherein said inclined surface terminates in a flat surface extending transversely to the axial direction to secure said tab.

* * * * *